United States Patent
Neal, Jr.

(10) Patent No.: US 7,191,732 B2
(45) Date of Patent: Mar. 20, 2007

(54) APPARATUS AND METHOD FOR FEEDING WILD ANIMALS

(76) Inventor: Robert G. Neal, Jr., Rice St., P.O. Box 228, Houston, TX (US) 75948

(*) Notice: Subject to any disclaimer, the term of this patent is extended or adjusted under 35 U.S.C. 154(b) by 0 days.

(21) Appl. No.: 10/920,467

(22) Filed: Aug. 18, 2004

(65) Prior Publication Data

US 2006/0118052 A1    Jun. 8, 2006

(51) Int. Cl.
- *A01K 1/00* (2006.01)
- *A01K 5/00* (2006.01)
- *A01K 39/00* (2006.01)

(52) U.S. Cl. .................. 119/57.91; 119/51.01

(58) Field of Classification Search .......... 119/57.91, 119/51.01, 57.8, 52.2, 52.1; D30/121, 122, D30/131, 133; 212/179, 294–296; 254/334–337, 254/323; 248/218.4, 219.2, 219.4; 294/82.11, 294/82.19, 82.13; 414/739
See application file for complete search history.

(56) References Cited

U.S. PATENT DOCUMENTS

| | | | | | |
|---|---|---|---|---|---|
| 272,236 | A | * | 2/1883 | Glennon | 212/179 |
| 5,199,527 | A | * | 4/1993 | Jennings | 182/187 |
| 5,263,675 | A | * | 11/1993 | Roberts et al. | 248/219.4 |
| 5,421,290 | A | * | 6/1995 | Welch | 119/51.11 |
| 5,503,108 | A | * | 4/1996 | Shaw | 119/57.8 |
| 5,794,563 | A | * | 8/1998 | Klepac | 119/57.91 |
| 6,045,442 | A | * | 4/2000 | Bounds | 452/187 |
| 6,202,964 | B1 | * | 3/2001 | Thornhill | 248/219.4 |
| 6,622,653 | B1 | * | 9/2003 | Starnes, Jr. | 119/51.01 |
| 6,684,812 | B1 | * | 2/2004 | Tucker | 119/57.91 |
| 6,695,688 | B1 | * | 2/2004 | Owen et al. | 452/187 |
| 6,739,964 | B2 | * | 5/2004 | Gearhart | 452/187 |

* cited by examiner

*Primary Examiner*—Teri Pham Luu
*Assistant Examiner*—Joshua Michener
(74) *Attorney, Agent, or Firm*—Beirne, Maynard & Parsons, L.L.P.

(57) ABSTRACT

A wild animal feeder is disclosed which is attachedly suspended form a tree or other stabilized element and may be horizontally and vertically suspended from same.

5 Claims, 3 Drawing Sheets

APPARATUS AND METHOD FOR FEEDING WILD ANIMALS

BACKGROUND OF THE INVENTION (1) Field of the Invention

The invention relates to an apparatus and method for operating a wild animal feeder.

(2) Description of the Prior Art

For years, wildlife enthusiasts have fed supplemental grains and minerals to wildlife. Many devices have been used for this purpose. The current trend is to employ containers that hold from as little as five gallons to as much as one thousand bushels of grain or supplement.

By far, the most popular container used for feeding supplemental grains and minerals is the fifty-five gallon drum, because such drums are inexpensive and are readily available. Most wildlife enthusiasts and hunters attach a mechanism to the drum that dispenses a measured amount of grain or supplement at predetermined times throughout the day or night. The drums are attached to many types of devices in order to elevate the drums above ground level, usually from three to ten feet, for supplemental feeding of wildlife.

The most common device for supporting a container above ground level for supplemental feeding of wildlife is a tripod system which has three legs, or a quadpod system, which has four legs. The legs of the tripod system and the quadpod system are generally attached to the container by bolts, sockets or by welding the legs directly to the container. While both the tripod system and the quadpod system have met with some success, problems have nevertheless been encountered when using such devices for supporting the container above ground level in that such devices are susceptible to being blown down by high winds and tipped or tilted by wild game or even domestic animals.

Rope and pulley-type systems are probably the second most common device for supporting a container above ground level for supplemental feeding of wildlife. The advantage of a rope and pulley system is that such a system is, of course, readily portable. However, when employing a rope and pulley system for supporting the container, the user is required to set up a support frame or locate a suitable tree with precisely proportioned limbs so that the pulley can be attached to the limb. To secure a pulley to a tree, the user must climb the tree, hand one or more pulleys, fill the container with grain or supplement and then raise the filled container to the desired level above the ground. Because of the many risks involved in securing one or more pulleys to the limb of the tree, potential injury to the user is evident. Moreover, many such systems have an additional disadvantage in that they position the feed contained above the ground, but also position it very close in proximity to the tree itself, thus severely limiting the radius of any spray of feed within the container.

U.S. Pat. No. 6,684,812, entitled "Animal Feeder Support Device" is directed to a feeder suspendable from a tree, but may not be laterally offset from the tree more than a very limited amount. Additionally, the vertical positioning of the feed barrel is not variable or selective once installation is effected.

U.S. Pat. No. 5,794,563, entitled "Stand-mounted Game Feeder Apparatus" is directed to a feeder on a stabilizing frame. While the vertical position of the feed barrel may be adjusted once fully assembled, the feeder cannot be offset from the framework any horizontal distance.

The present invention addresses many of the problems associated with prior art devices.

SUMMARY OF THE INVENTION

The invention relates to a wild animal feeder including a feed container and to the method of its operation. As used herein "wild animals" includes deer and other animals frequently hunted by man for food and/or trophy. It also includes domestic animals, as well, as, oftentimes, there is little, if any difference, between the two, as far as the need or desire to provide safe and expedient attractants for feed for such animals.

The feed container may be provided in any number of sizes and shapes, well known to hunters and sportsmen as well as out door outfitters. For example the feed container may be a steel or plastic 55 gallon drum, open-ended at the top, for introduction of the feed, and containing a battery powered, motorized, timed, sprayer unit at the lower end and openings therein for the discharge in a spray of the feed as needed. The type of feed used in the feeder is conventional in nature.

The feeder is affixed around and suspended from a substantially vertical support element. As used herein a "substantially vertical support element" includes a tree; a branch of a tree; a large bush; a plastic, wooden or metallic pole; and any other similar structure capable of conveniently supporting the wild animal feeder and which is relatively easy to select or build in areas where wild animals typically feed. In most typical instances, the support structure will be the trunk of a tree.

The feeder of the present invention also includes a first, upper, support system which includes a metallic or other stout brace and means for mounting the brace to the support element, or tree trunk. A suspension bar having an outboard end is provided and is pivotally mounted to the brace for selective horizontal movements. The bar typically will be made of steel or other hard metal or plastic. Means, such as a heavy rope, wire rope, or chain, are provided for alignment of the suspension bar for positioning relative to the support element. Control means, which may also be provided in the form of a comparatively long rope, wire rope, cable or chain, is at least partially carried along the suspension bar for adjusting the vertical height of the feed container, and for raising and lowering of same. One end of the control means is secured to the feed container immediate its upper end.

The feeder also comprises a second, or lower, support system which has a brace, preferable of rectangular metallic or strong plastic construction and means, such as a plurality of angled struts secured to one face or side of the brace for grasping upon or around the support element. The struts may have beveled teeth as in a saw tooth configuration for aiding in grasping a tree trunk or the like. Finally, a winch is mounted on the second brace and receives one end of the control means or cable, for selectively raising, positioning and lowering the feed container. The winch is preferably mounted on the second plate at a ninety degree angle so that a crank operating the winch may be positioned for convenient and easy hand manipulation.

DESCRIPTION OF THE PREFERRED EMBODIMENT

Figure 1:
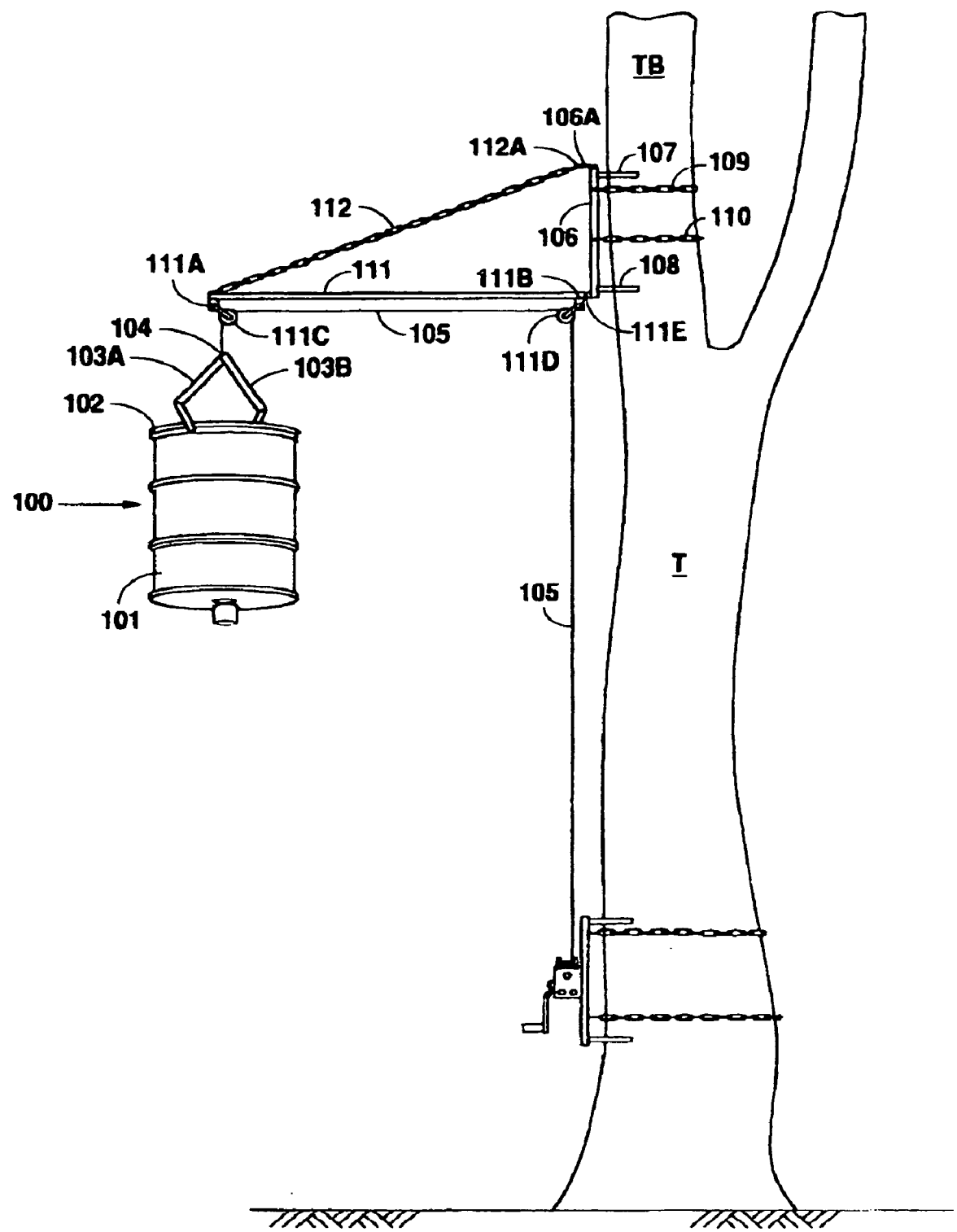
FIG. 1 is a schematic view of the wild animal feeder of the present invention mounted to a tree trunk and branch, as the support structure.
Figure 2:
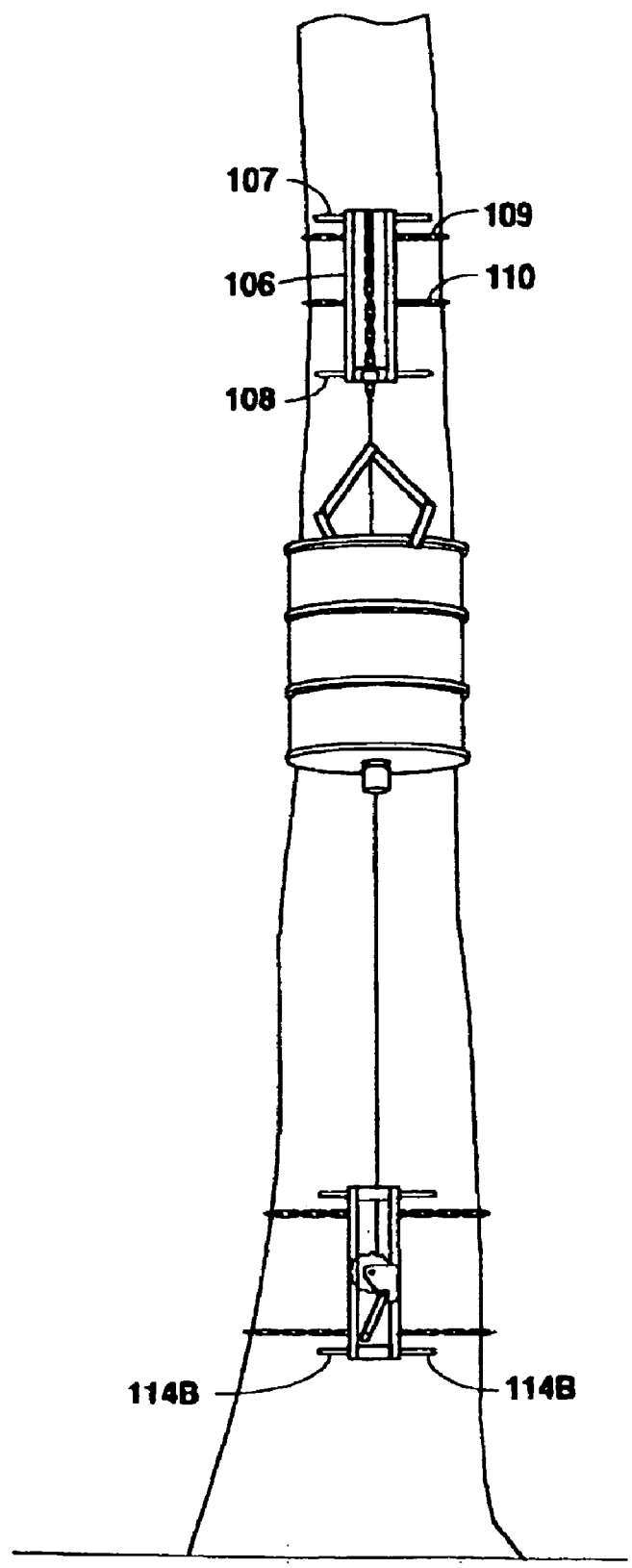
FIG. 2 is a view similar to that of FIG. 1 but from a head-on or side view ninety degrees from the views of FIG. 1.

Now, with first reference to FIG. 1, there is shown the wild animal feeder 100 of the present invention, mounted to a support element in the form of a tree with trunk T and offset large branch TB. The animal feeder includes a feed container 101 in the form of a 55 gallon drum having an upper end 102, which may be enclosed, and which contains suspending arms 103A and 103B thereon. A first end 104 of a control means, such as a wire rope or cable 105 is attached to the arms 103A and 103B.

The first, or upper support system, includes a brace 106 which is securely mounted to the tree branch TB my means of upper and lower pairs of struts 107, 108, which extend outwardly from one side of the brace 106. The struts 107, 108 are angled and extend outwardly of the brace 105 in order to grasp around the tree branch TB. The struts 107, 108 are part of the means for mounting the upper brace 106 to the tree branch TB. The mounting means further includes mounting cables or chains 109, 110 extending from the brace 106 which may be wrapped around the tree branch TB and into or onto the brace, in any number of convenient manners.

Figure 3:
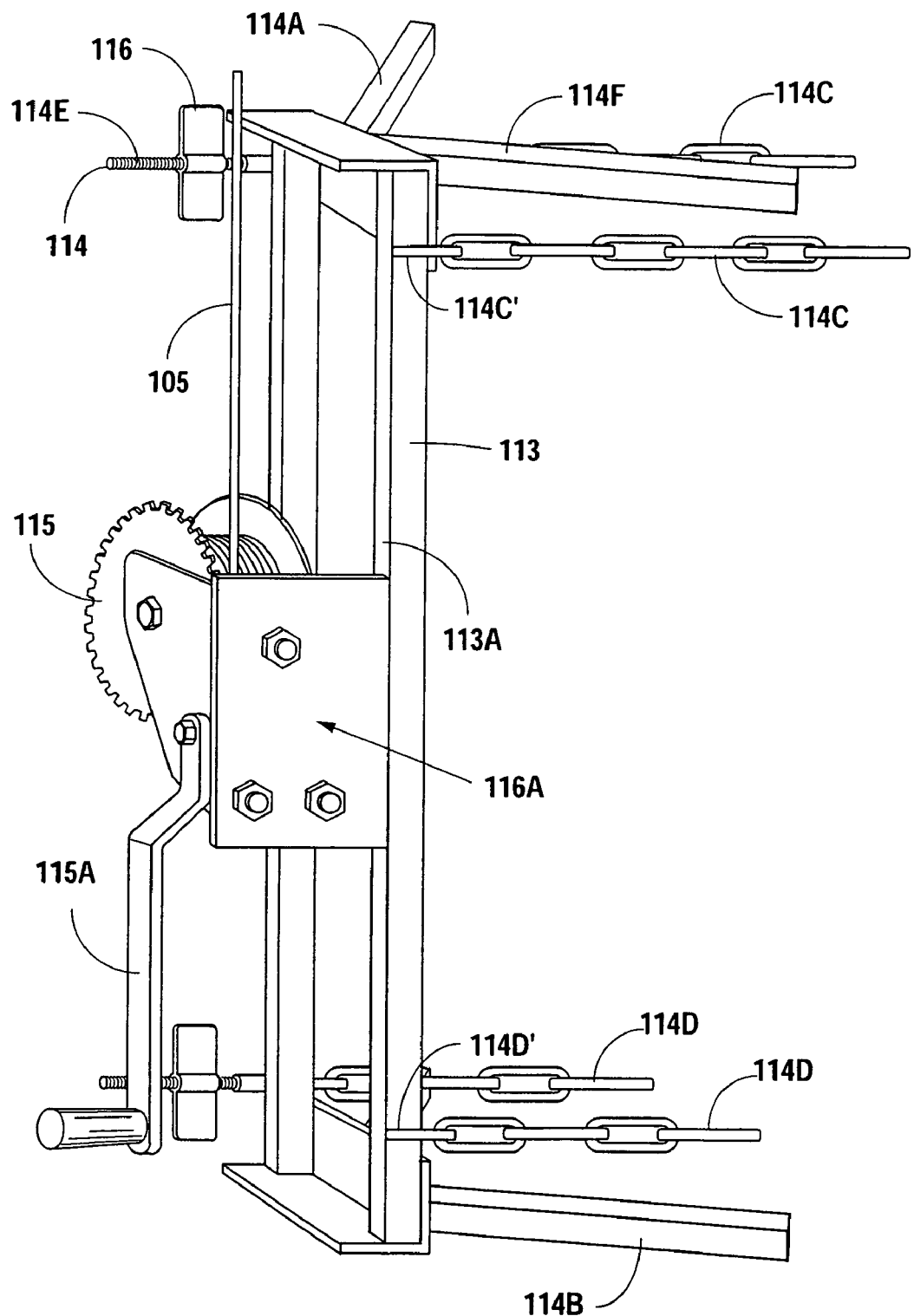
FIG. 3 is an enlarged view of the second, lower support system of the present invention.

The first, or upper support system, further includes a suspension bar 111 having first and second ends 111A, 111B. The first, or outboard end 111A of the suspension bar 111 secures a pulley 111C which receives the cable 105 there through and permits the cable 105 to transpose vertical movements into horizontal movements as the cable 105 passes there across. At the inboard, or second end 111B of the suspension bar 11 is a similar pulley 111D which functions in like manner as pulley 111C. The suspension bar 111 is pivotally mounted to the brace 105 at pivot 111E. The suspension bar 111 also has secured at the outboard or first end 111A an alignment means including a cable or wire rope or chain-like adjustor 112 which, in turn, has its inboard end 112A connectable to the brace 106. The length of the adjustor cable 112 extending from the brace 106 may, of course, be varied, as by including a hook 106A or the like, on the brace whereby some length of cable 105 may be wrapped around the hook 106A, or otherwise secured onto the brace 106, thus shortening (or lengthening) the alignment 112, to provide for satisfactory alignment of the bar 111, relative to the support or tree T and or the ground, as the case may be The cable 105 extends downwardly from the pulley 111D to the second, lower support system. Now, with more particular reference to FIG. 3, the lower support system comprises a second brace 113. The brace 113 is mounted to the tree T by means of upper and lower pairs of outwardly extending angled struts 114A and 114B. Once the brace 113 is positioned along the tree T, it is secured thereto by additional mounting means consisting of upper and lower cables 114C and 114D each of the cables 114C and 114D have first ends 114C' and 114D' which are bolted or welded or otherwise securely fastened to the brace 113. Similarly, a link 114D in the chains 114C and 114D may be placed onto a cable or chain tightening bolt 114, also secured to the brace 113, and the respective chain or cable 114C, 114D tightened around the tree T by outwardly, rotating a key 116 threadedly mounted on the bolt 114 around threads 114E. Inward rotation of the key 116, will, of course, loosen the cables or chains 114C and 114D for removal of the feeder form the tree T.

It will be appreciated that the first, or upper, support system may also have a chain or cable mounting and securing means as described for the second, lower support system.

The second end (not shown) of the cable 105 is wrapped around the winch assembly 115 which, in turn, is secured to the brace 113 by means of a plate 116A, offset ninety degrees from an outward face 113A of the brace 113. An arm 115A is bolted to the winch assembly 115 for cranking the winch assembly 115 to permit the cable 105 to be expanded to lower the container 101, or drawn in or contracted, when the container 101 is lifted.

OPERATION

When it is desired to place the container 101 at the elected location, which includes placing the container 101 proximate to selected support element, such as tree T and branch TB, the first, upper support system is affixed to the tree branch TB by aligning the struts 107, 108 onto the outer surface of the branch TB and the chains 109 and 110 are wrapped around the tree branch TB and an end of each chain or cable 109, 110, is placed onto the bolts 114 (FIG. 3) outboard of the key 116. The key 116 is rotated to move it outboard on the bolt 114 and away from the brace 106 until the brace 106 is secured tightly around the tree branch TB.

Next, the suspension bar 111 is secured at end 111B to the pivot connection 111E. The suspension bar 111 is horizontally aligned relative to the ground and/or the tree T by positioning of the alignment cable 112 and securing one end 112A of the cable or chain 112 to the upper end or hook 106A of the upper brace 106. After alignment of the suspension bar 111, one end, the outboard end 104 of the cable 105 is drawn over the pulleys 11C and 11D and a length of cable 105 is dropped to the ground and affixed to the members 103A and 103B at the center 104 of the container 101.

The second, or lower support system is affixed to the tree T as described, above, relative to the securement of the first, upper, support system. Now the feeder container 101 may be filled with feed and hoisted to the desired vertical position by rotating the crank arm 115A to pull in and onto the winch 115 the cable 105. When the container 101 is properly positioned at its desired height, the winch is locked in place in conventional fashion.

The procedure is reversed to lower the container and/or remove the feeder assembly, as desired.

Although the invention has been described in terms of specified embodiments which are set forth in detail, it should be understood that this is by illustration only that the invention is not necessarily limited thereto, since alternative embodiments and operating techniques will become apparent to those skilled in the art in view of the disclosure. Accordingly, modifications are contemplated which can be made without departing from this spirit of the described invention.

What is claimed and desired to be secured by Letters Patent is:

1. A wild animal feeder including a feed container, for affixation around and suspension from a substantially vertical support element, comprising:
   (1) a first, upper, support system, including:
      (a) a brace;
      (b) means for mounting the brace to the support element;

(c) a suspension bar pivotally mounted to the brace for selective horizontal movements there from, said suspension bar having an outboard end;
(d) means for aligning the suspension bar in a pre-determinable position relative to the support element;
(e) control means at least partially carried along the suspension bar for adjusting the vertical position of the feed container, said control means having first and second ends, said first end being in engagement with the feed container;
(2) a second, lower, support system, including:
(a) a brace;
(b) means for mounting the brace to the support element comprising at least one chain and means for securely positioning the chain around the support element; and
(c) means including a winch and engaging the second end of the control means for selectively raising, positioning and lowering the feed container.

2. The wild animal feeder of claim 1 wherein the means for mounting the braces to the support element comprises a plurality of angled struts for grasping upon the support element and at least one chain and means for mounting the brace of the upper support system comprises means for securely positioning the chain around the support element.

3. The wild animal feeder of claim 1 wherein the means for aligning the suspension bar comprises an adjustable elongated belt means having one end secured at the outboard end of the suspension bar and having means along its length for attaching the belt means to the brace of the upper support system, whereby the suspension bar may be placed in a substantially horizontal position.

4. The wild animal feeder of claim 1, further comprising a plate with first and second faces, said plate being mounted ninety degrees offset and to the second brace, said winch and hand manipulatable winch crank being positioned on one face of said plate and offset from said second brace.

5. A method of operating a wild animal feeder including a feed container, comprising the steps of:

(A) providing an apparatus comprising:
(1) a first, upper, support system, including:
(a) a brace;
(b) means for mounting the brace to the support element;
(c) a suspension bar pivotally mounted to the brace for selective horizontal movements there from, said suspension bar having an outboard end;
(d) means for aligning the suspension bar in a pre-determinable position relative to the support element;
(e) control means at least partially carried along the suspension bar for adjusting the vertical position of the feed container, said control means having first and second ends, said first end being in engagement with the feed container;
(2) a second, lower, support system, including:
(a) a brace;
(b) means for mounting the brace to the support element comprising at least one chain and means for securely positioning the chain around the support element;
(c) means including a winch and engaging the second end of the control means for selectively raising;
(B) positioning and lowering the feed container;
(C) securing the first brace upon the support element;
(D) manipulating the adjustment bar to a pre-determinable position whereby the adjustment bar is in substantially horizontal alignment with the ground;
(E) securing the second brace upon the support element;
(F) affixing the feed container to the control means; and
(G) moving the control means to raise and retain the feed container at a given height relative to the support element.

\* \* \* \* \*